(12) United States Patent
Damera-Venkata (10) Patent No.: US 9,330,065 B2
(45) Date of Patent: May 3, 2016

(54) GENERATING VARIABLE DOCUMENT TEMPLATES (75) Inventor: Niranjan Damera-Venkata, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 455 days.

(21) Appl. No.: 13/825,566

(22) PCT Filed: Sep. 26, 2010

(86) PCT No.: PCT/US2010/050322
§ 371 (c)(1),
(2), (4) Date: Mar. 22, 2013

(87) PCT Pub. No.: WO2012/039723
PCT Pub. Date: Mar. 29, 2012

(65) Prior Publication Data
US 2013/0185632 A1    Jul. 18, 2013

(51) Int. Cl.
G06F 17/00    (2006.01)
G06F 17/21    (2006.01)
G06F 17/24    (2006.01)

(52) U.S. Cl.
CPC ............ *G06F 17/211* (2013.01); *G06F 17/248* (2013.01)

(58) Field of Classification Search
CPC ............................. H01L 28/91; G06F 3/0484
USPC .......................................... 715/243, 200, 244
See application file for complete search history.

(56) References Cited

U.S. PATENT DOCUMENTS

| 6,590,589 | B1 | 7/2003 | Sluiman et al. |
| 7,028,255 | B1 * | 4/2006 | Ayers ............................. 715/202 |
| 7,200,816 | B2 | 4/2007 | Falk et al. |
| 7,548,334 | B2 | 6/2009 | Lo et al. |

(Continued)

FOREIGN PATENT DOCUMENTS

| CA | 2255021 | 5/2000 |
| JP | 2003303183 | 10/2003 |

(Continued)

OTHER PUBLICATIONS

J. Lumley, R. Grimson, O. Rees, "A framework for structure, layout and function in documents", ACM Symposium on Document Engineering 2005, Nov. 2-5, 2005, Bristol, U.K.

*Primary Examiner* — Manglesh M Patel
(74) *Attorney, Agent, or Firm* — Ed Garcia Attorney At Law (57) ABSTRACT

A graphical user interface 30 that includes a template design area is displayed. Based on one or more commands received through the graphical user interface 30, a layout of template elements (44-50) is arranged with respective relative positions and sizes in the template design area (34), where at least one of the template elements (44-50) is designated for receiving variable document content 16. Through the graphical user interface 30, values of parameters characterizing one or more associated adaptive layout variables that constrain adaptability of respective ones of the template elements (44-50) to different document content 16 are received. At least one of the parameters characterizes a degree of variability of the associated adaptive layout variable. The relative positions of the template elements (44-50) are encoded in the template design area in association with the respective parameter values in a variable document template data structure (18).

20 Claims, 7 Drawing Sheets

(56) References Cited

U.S. PATENT DOCUMENTS

| | | |
|---|---|---|
| 7,676,744 B2 | 3/2010 | Hanechak |
| 8,042,039 B2 * | 10/2011 | Anderson ............ 715/246 |
| 2006/0224952 A1 * | 10/2006 | Lin ............ 715/517 |
| 2009/0024917 A1 | 1/2009 | Giannetti |
| 2009/0216545 A1 | 8/2009 | Rajkumar et al. |

FOREIGN PATENT DOCUMENTS

| | | |
|---|---|---|
| JP | 2006-171979 A | 6/2006 |
| JP | 2007-041944 A | 5/2007 |
| KR | 10-2005-0036702 A | 4/2005 |
| KR | 10-2009-0102827 A | 9/2010 |

* cited by examiner

GENERATING VARIABLE DOCUMENT TEMPLATES

BACKGROUND

Electronic documents are created in many different ways. For example, desktop application programs, such as Microsoft Word, Quark Design, and Adobe InDesign, frequently are used to create electronic documents. These electronic documents contain various types of content arranged with a particular layout and style.

Template-based electronic document formats describe a predefined layout arrangement of fields that are capable of accepting variable content. In some approaches, the size, shape and placement of the template fields are fixed. In another approach, an electronic document is represented as an adaptive layout template that contains predefined content areas whose positions and sizes may be varied within specified ranges. In particular, the content areas are defined by variables with respective value domains that define the size, position, and content of the content areas. A user specifies constraints that limit variable ranges and define relationships between variables and values. A constraint solver typically generates a final document that satisfies all of the specified constraints.

In general, the templates that are used to describe the look and feel of template-based electronic documents are generated manually using a process that is labor-intensive and uses significant computer graphics skills.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

As used herein a "computer" is any machine, device, or apparatus that processes data according to computer-readable instructions that are stored on a computer-readable medium either temporarily or permanently. A "computer operating system" is a component of a computer system that manages and coordinates the performance of tasks and the sharing of computing and hardware resources. A "software application" (also referred to as machine readable instructions, software, an application, computer software, a computer application, a program, and a computer program) is a set of instructions that a computer can interpret and execute to perform one or more specific tasks. A "data file" is a block of information that durably stores data for use by a software application.

The term "computer-readable medium" refers to any tangible, non-transitory medium capable storing information that is readable by a machine (e.g., a computer). Storage devices suitable for tangibly embodying these instructions and data include, but are not limited to, all forms of physical, non-transitory computer-readable memory, including, for example, semiconductor memory devices, such as random access memory (RAM), EPROM, EEPROM, and Flash memory devices, magnetic disks such as internal hard disks and removable hard disks, magneto-optical disks, DVD-ROM/RAM, and CD-ROM/RAM.

A "variable document template" is a data struck re that specifies one or more template elements, including at least one template element that is designated for receiving variable document content. A "template element" is any component of a variable document template that imposes a constraint in an optimization process for determining a final document specification for document content to be inserted into the variable document template. Examples of template elements include content blocks (e.g., title text, text streams, figures, advertisements) and white space between content blocks. The adaptability of a template element to different document content typically is constrained by at least one adaptive layout variable that is characterized by one or more respective parameters whose values typically are set by a document template designer.

As used herein, the term "page" refers to any type of discrete area in which graphic objects may be laid out, including a physical page embodied by a discrete physical medium (e.g., a piece of paper) on which a layout of graphic objects may be printed, and a virtual, digital or electronic page containing a layout of graphic objects that may be presented to a user by, for example, an electronic display device.

A "window" is a visual area of a display that typically includes a user interface. A window typically displays the output of a machine readable instructions process and typically enables a user to input commands or data for the machine readable instructions process. A window that has a parent is called a "child window." A window that has no parent, or whose parent is the desktop window, is called a "top-level window." A "desktop" is a system-defined window that paints the background of a graphical user interface (GUI) and serves as the base for all windows displayed by all machine readable instructions processes.

As used herein, the term "includes" means includes but not limited to, and the term "including" means including but not limited to. The term "based on" means based at least in part on.

The examples that are described herein provide a graphical user interface that enables efficient creation of variable document templates (also referred to as variable page templates) for generating documents with variable content. The graphical user interface includes intuitive tools and visualizations that allow users to quickly and efficiently design a layout of template elements, group template elements, and specify parameters characterizing the template elements, including parameters that characterize degrees of variability of variables that constrain the adaptability of variable ones of the template elements to different document content.

Figure 1:
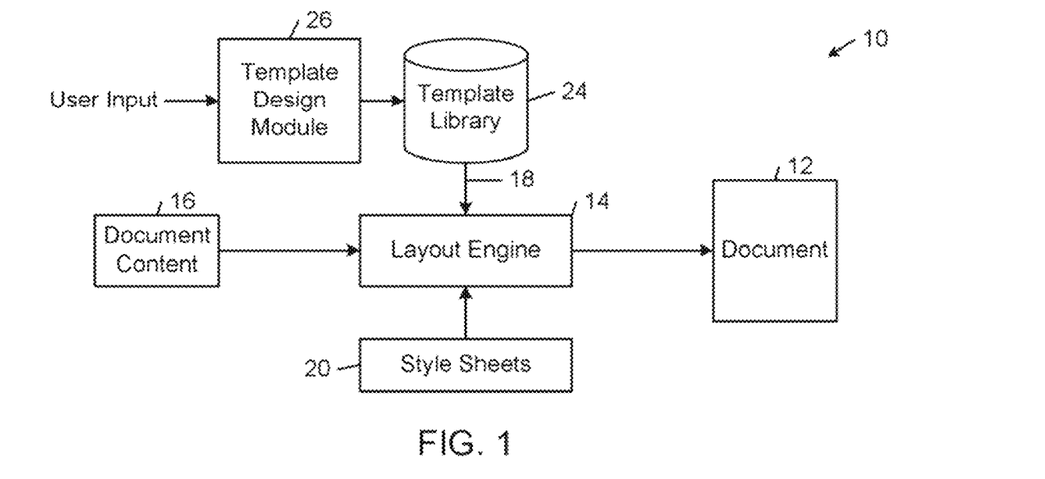
FIG. 1 is a block diagram of an example of a document processing system for generating documents with variable content.

FIG. 1 shows an example of a document processing system 18 for generating a document 12 with variable content.

The document processing system 10 includes a layout engine 14 that processes electronic document content 16 based on one or more variable document templates 18 and one or more style sheets 20 to produce the document 12. In some examples, the layout engine 14 processes the document content 16 on a page-by-page basis. In other examples, the layout engine 14 may process the document content 16 on a multi-page basis. The layout engine 14 may be implemented in any computing or processing environment, including in digital electronic circuitry or in computer hardware, or machine readable instructions (including firmware or software). In some examples, the layout engine 14 is implemented by one or more respective machine readable instructions modules that are executed on a computer. Computer process instructions for implementing the layout engine 14 and the data it generates are stored in one or more computer-readable media.

The document content 1 typically includes a list of document contents (e.g., figures and text), a description of the logical relationships (e.g., linkages) between the document contents, and annotations that assigning respective types to the contents (e.g., title, header, sidebar, pull quote, and advertisement) in accordance with a content description schema that is parsable by the layout engine 14. In an example for a typical magazine, the document content 16 may include a stream of text blocks, a stream of figures, a stream of sidebars, a stream of pull quotes, a stream of advertisements, and a description of the logical relationships between these contents. In some examples, the document content 16 is contained in an XML (eXtensibie Markup Language) data file that describes the structure of the document contents and identifies the types of the document content elements with attribute tags in accordance with a markup language schema. This representation decouples the content from the presentation and allows variation in the size, number and relationship among content blocks. Adding or deleting content elements is accomplished easily by addition or deletion of sub-trees in the XML structure, and content modifications simply involve changing the content of an XML leaf-node.

The following is an example of an XML document content specification:

```
<root template library="ABC.xml" library collection="report">
    <title id="0">TITLE TEXT BLOCK</title>
    <sidebar ref="0" name="profile">
        <f w="1661" ref="0" h="2164" src="XYZ.jpg" id="1"> </f>
            <t type="sidebar_para" id="1">SIDEBAR TEXT BLOCK,</t>
        <t type="sbpara" id="2">
            SIDEBAR TEXT BLOCK
        </t>
            <t type="sbpara" id="3">
            SIDEBAR TEXT BLOCK
        </t> = {ending tag}
    </sb>
    <t type="head" id="1">HEADER TEXT BLOCK </t>
    <t type="para" id="2">
        PARAGRAPH TEXT BLOCK
    </t>
    <t type="spacer" id="3"> </t>
        <t type="para" id="4">PARAGRAPH TEXT BLOCK</t>
        <t type="list" id="5">
            LIST ITEM 1 TEXT BLOCK
    </t>
    <t type="list" id="6">
        LIST ITEM 2 TEXT BLOCK
    </t>
        <t type="spacer id" id="8"> </t>
        <t type="para" id="9">
        PARAGRAPH TEXT
    </t>
</root>
```

In this example, the XML document content specification identifies a template library (i.e., ABC.xml) and a template collection (i.e., report) within the template library from which the layout engine 14 will select one or more templates that will be adapted to accommodate the documents contents contained in the XML document content specification. The XML document content specification also describes a title, a sidebar that includes a figure (i.e., XYZ.jpg) and a number of text blocks, a header, several paragraphs, a number of list items, and a number of spacers.

Figure 2:
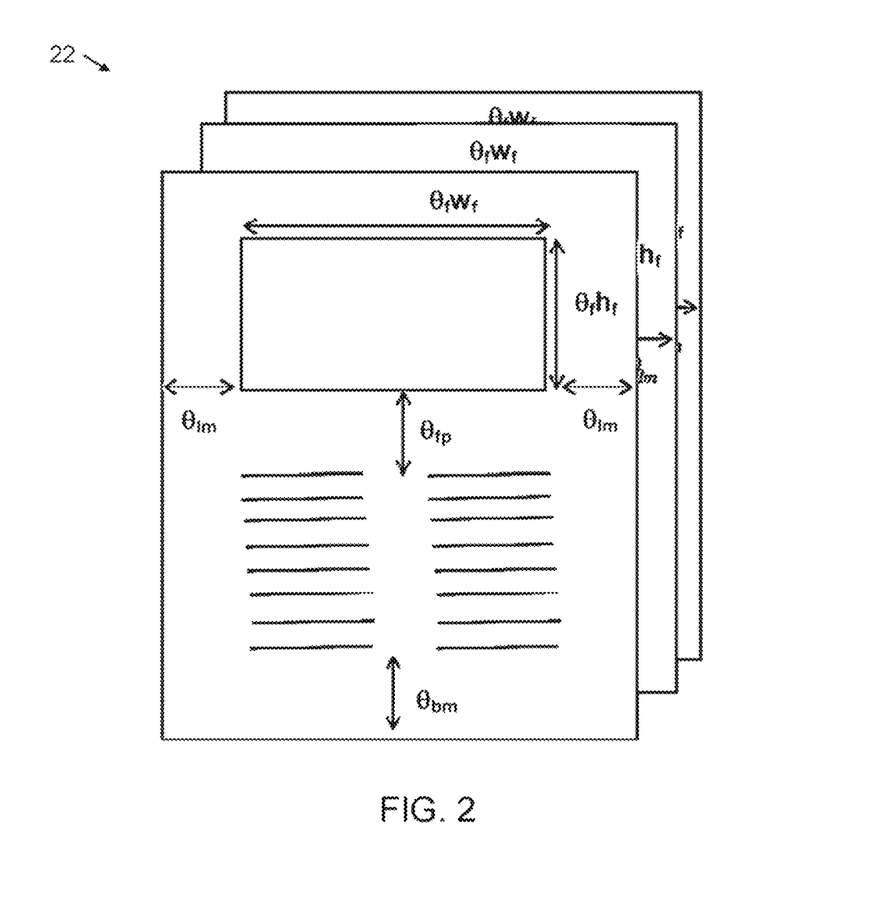
FIG. 2 is a block diagram of an example of a set of variable document templates.
Figure 3:
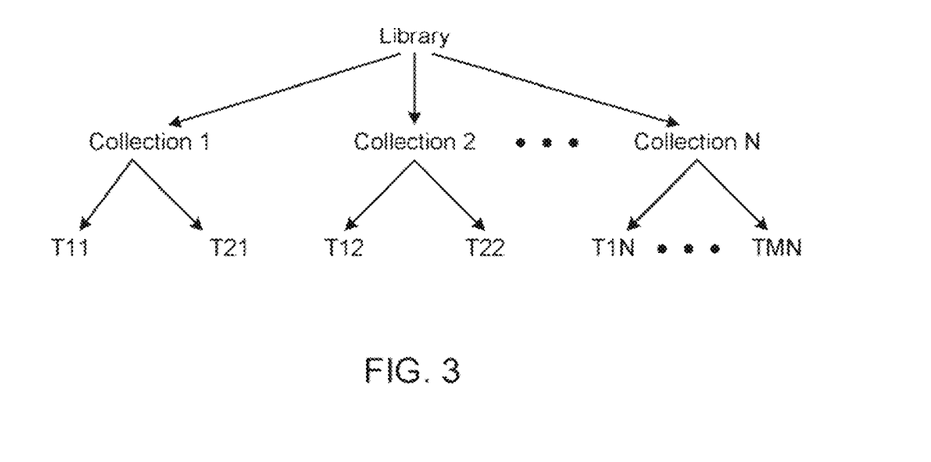
FIG. 3 is diagrammatic view of an example of an hierarchical arrangement of templates into collections of a template library

FIG. 2 shows an example of a set 22 of the variable document templates 18, where the θ's represent template element variables (e.g., white space dimensions and figure scale factors) that constrain the adaptability of the template elements to different document content. The variable document templates 18 are selected from a template library 24 that contains an indexed set of variable document templates. FIG. 3 shows an example of an hierarchical arrangement of templates (T11 . . . TMN) into collections (Collection 1, . . . , Collection N) of a template library. In some examples each template library represents a particular type of document (e.g., annual report or newsletter), and each collection represents a section (e.g., appendix or table of contents) of a document of the type represented by the library. In some examples, a specification of all the templates and collections of a particular template library is stored in one or more XML data files.

Different styles can be applied to the same variable document template 8 via the style sheets 20. A variable document template 18 typically specifies one or more associated style sheets 20 for formatting respective sections of the template. As explained above, the content blocks within the document content 16 typically have attributes that denote their type (e.g., text blocks may be tagged as header, sub-header, list item, paragraph, and caption). The document style sheet 20 associated with the selected variable document template defines the type definitions and the formatting for the types of the content blocks in the document content 16. For example, the style sheet may define a "header" to use Arial bold font with a specified font size and line spacing. Different style sheets can apply different formatting to the same document content 16. Also, type definitions are scoped within template elements. For example, two different types of sidebars may have different text formatting applied to side bar text with a sub-header attribute. The style sheet 20 also typically defines overall document characteristics, such as, margins, bleeds, page dimensions, and spreads. Different sections of the same document may be formatted with different style sheets. Style sheets typically are created by a professional graphic designer.

The document 12 may be any type of electronic document, including an editable markup document (e.g., an Adobe FrameMaker document, a rich text format document, or a Microsoft Word document), a formatted markup document (e.g., an Adobe PDF document or an Adobe PostScript document), and a rendered image document (e.g., a bit map image document). The document 12 may contain one or more pages of content.

In operation, the layout engine 14 processes the document content 16 to determine an appropriate variable document template 18 to select from the template library 24 for each page of the document 12. The layout engine 14 also selects one or more style sheets 20 for formatting the document content 16. Based on the document content 16, the selected variable document templates 18, and the selected style sheets 20 determines the values of the variables in the selected variable document templates 18 based on an optimization process. The layout engine 14 generates the document 12 based on the variable document templates 18, the determined variable values, and the document content 16. In this process, the layout engine 14 populates the variables in the variable document templates 18 with the determined variable values. At this point, the resulting one or more layout templates 18 fully specify the layout of the document 12. The layout engine 14 generates the document 12 by rendering the document content 16 in accordance with the resulting, fully-specified layout template. Multiple customized documents 12 may be generated based on the selected variable document templates 18 simply by changing the document content 16.

Referring back to FIG. 1, the document processing system 10 includes template design module 26 that enables a user to create one or more variable document templates and store the templates in the template library 24. The template design module 26 typically is implemented by a machine readable instructions application that is executed by a computer to provide a user interface that assists the user in the process of creating a variable document template. This process typically includes determining a layout of content blocks, specifying optimization paths and path groups that define the logical relationships between the template elements, and specifying respective degrees of variability (e.g., probability distribution parameters) for individual ones of the variables.

Figure 4:
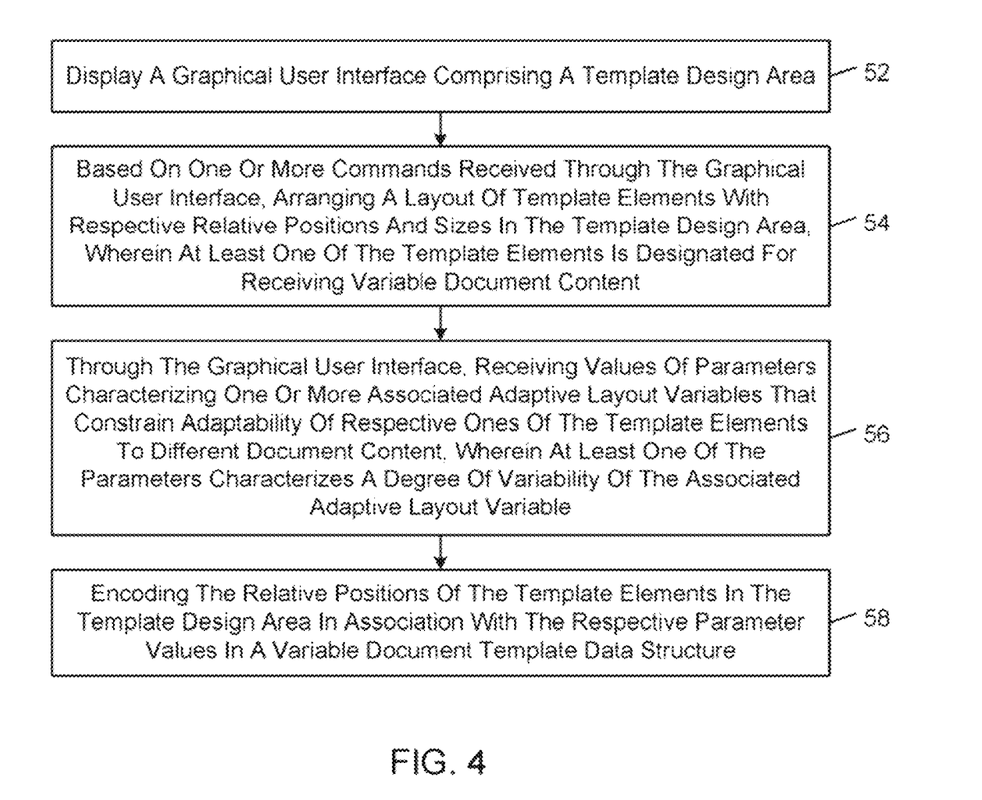
FIG. 4 is a flow diagram of an example of a method of generating a variable document template.

FIG. 4 shows an example of a method by which the template design module 26 creates a variable document template. In accordance with this method, the template design module 26 displays the graphical user interface 30 that includes the template design area 34 (FIG. 4, block 52). Based on one or more commands received through the graphical user interface 30, the template design module 26 arranges a layout of template elements with respective relative positions and sizes in the template design area, wherein at least one of the template elements is designated for receiving variable document content (FIG. 4, block 54). Through the graphical user interface, the template design module 26 receives values of parameters characterizing one or more associated adaptive layout variables that constrain adaptability of respective ones of the template elements to different document content, where at least one of the parameters characterizes a degree of variability of the associated adaptive layout variable (FIG. 4, block 56). The template design module 26 encodes the relative positions of the template elements in the template design area in association with the respective parameter values in a data structure (FIG. 4, block 58).

Figure 5:
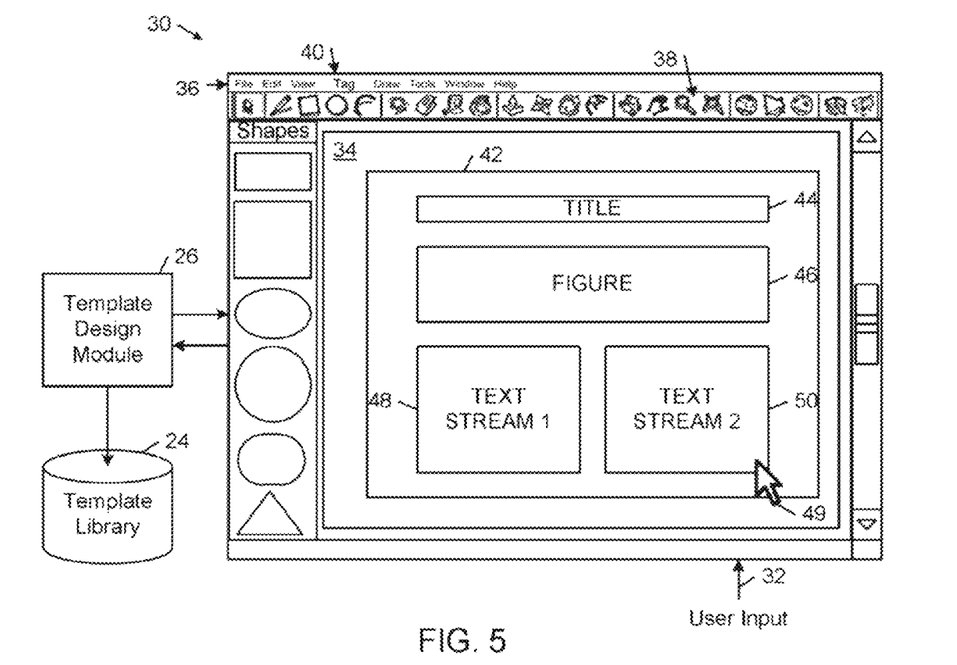
FIG. 5 is a diagrammatic view of an example of a graphical user interface for generating a variable document template.

FIG. 5 shows an example of the template design module 24 that generates a user interface 30 for creating an adaptable layout template 18 in response to user input 32. The graphical user interface 30 includes a template design area 34, menus 36, and toolbars 38.

The menus 36 provide access to drawing tools, commands, and settings. The example menus 36 shown in FIG. 5 include File, Edit, View, Draw, Tools, Windows, and Help menus, as well as a Tag menu 40 that provides access to tools for assigning type tags (e.g., title, figure, and text stream) to the template elements in the template design area 34. These tools may be integral components of the template design module 24 or may be provided as part of a plug-in extension to a graphics application, such as Visio® (available from Microsoft Corporation of Redmond, Wash., USA), SketchUp (available from Google Inc. of Mountain View, Calif. USA), and InDesign® (available from Adobe Systems Incorporated of San Jose, Calif. USA).

The toolbars 38 contain a user-definable set of tools and controls. The example set of toolbars 38 shown in FIG. 5 corresponds to tools and commands that typically are found in a graphic design tool, which may be selected and activated by commands generated by an input device (e.g., a computer mouse) in connection with a pointer 49 that is displayed on the graphical user interface 30.

The template design area 34 is where a template designer creates a model of an adaptable layout template. In response to user command to create a new variable document template, the template design module 26 creates a blank page template 34 that is presented as a template canvas 42 (or page) to the user. Using the tools available through the menus 36 and toolbars 38, the designer is able to place on the template canvas 42 rectangles representing template elements that are designated for receiving variable document content. In the example illustrated in FIG. 4, there are three types of content blocks: a title book 44, a figure block 46, and two text stream blocks 48, 50. The text stream blocks represent streams of text sub-blocks, including headings, subheadings, and list items. Each content template element is created and positioned as a block on the page and overlap of the blocks is handled with a layer attribute. The types and formatting of the sub-blocks that can be included in a text stream are defined in the associated document style sheet 20.

The graphical user interface 30 allows the user to specify attributes for each template, including background color, background image, first page template flag, and last page template flag. These attributes allow for common template customizations.

The graphical user interface 30 also allows the user to specify properties of the content template elements. In one example implementation, in response to a command to execute a selected content template element (e.g., by single-clicking or double-clicking a pointing device when the associated pointer is positioned over the selected content template element), the template design module 26 generates a property editor window that presents the user with a set of editable properties that are appropriate for the selected content template element. Examples of text stream properties include: fixed text width (which may be set with a MACRO so that it can adapt to page dimensions); allowed text stream elements (e.g., header, sub-header, paragraph, list item, in-line figure); and font properties for the allowed elements. Text stream properties for main body streams are global for the whole document (i.e., any edits are applied globally to the collection style sheet). In addition, text streams within sidebars may have independent properties. Examples of figure properties include: minimum and maximum heights and widths; and caption properties, which may be set similar to text stream element properties described above.

The graphical user interface 30 allows the user to group template elements. In one example implementation, based on one or more commands received through the graphical user interface 30, the template design module 26 groups respective ones of the template elements into a template element group, generates a specification of an optimization path, encodes the specification of the optimization path into the data structure, and displays a graphic representation of the optimization path in the template design area 34.

Figure 6:
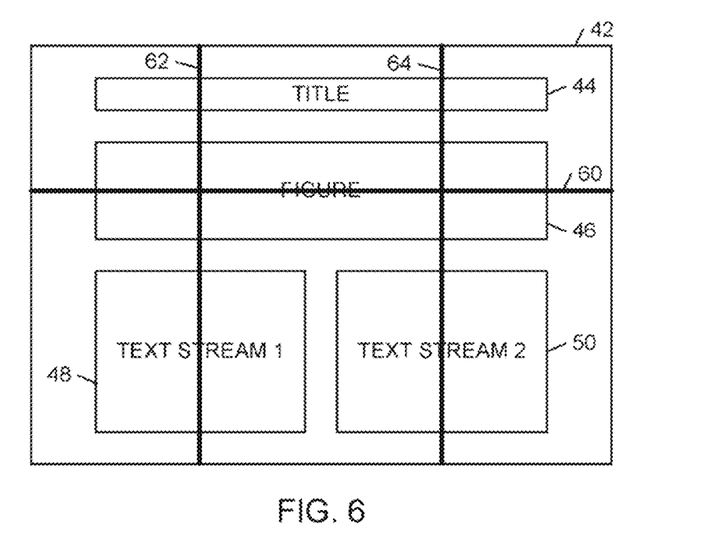
FIG. 6 is a diagrammatic view of an example of a template canvas containing a layout of template elements and graphic representations of three optimization paths designating respective groups of template elements.

FIG. 6 shows an example of the layout of template elements 44-50 on the template canvas 42 and graphic representations of three optimization paths 60-64 that extend over respective groups of template elements to designate the respective groupings of the template elements along each path. The template design module 26 generates the graphic representations of the optimizations paths based on one or more commands received through the graphical user interface 30 that specify a line extending over the template elements of the template element group in the template design area 34. In this example, the user draws two vertical lines 60, 62 and one horizontal line 64 across the template canvas 42 to indicate paths that the layout engine 14 will optimize. Specification of an optimization path indicates the user's goal that content block and whitespace template elements along the path match specified path lengths (e.g., height or width). The user typically sets the path lengths to the canvas height or width in order to encourage the layout engine 14 to produce full page layouts with minimized underfill and overfill.

Figure 7:
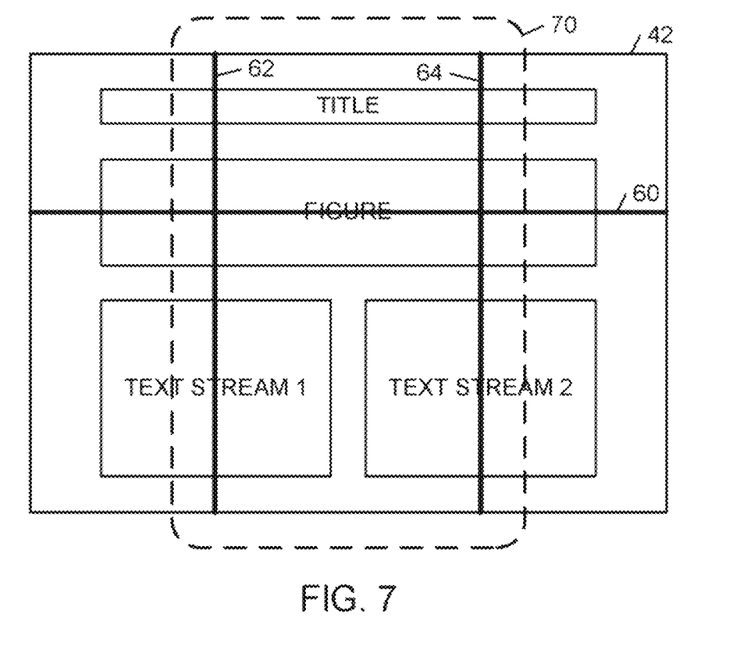
FIG. 7 is a diagrammatic view of an example of the template canvas of FIG. 6 and an example of a graphical designation of a group of two of the three optimization paths into an optimization path group.
Figure 8:
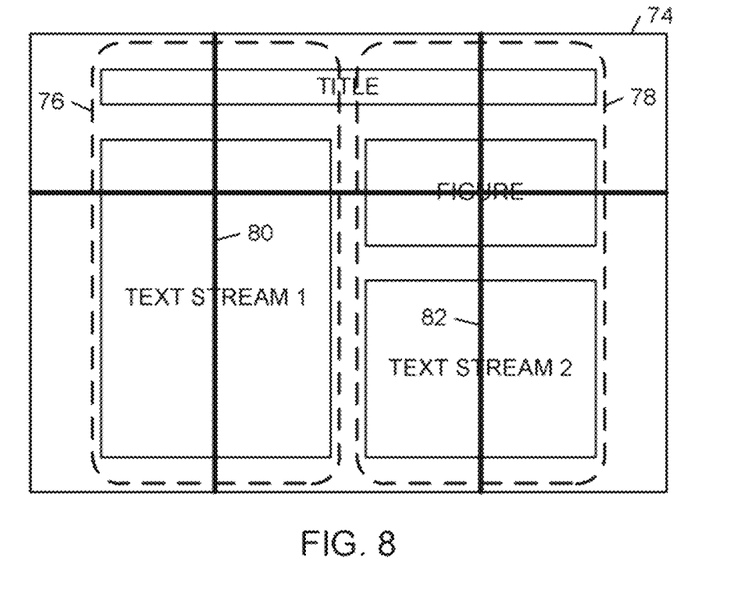
FIG. 8 is a diagrammatic view of an example of a template canvas containing a layout of template elements and an example of a graphical designation two groups of the template elements.

Optimization paths may be grouped together to indicate that text will flow from one path to the next. For example, FIG. 7 shows an example in which the user has designated the two vertical paths 62, 64 as members of an optimization path group 70 by, enclosing the paths 62, 64 in a rounded rectangular boundary. In the example shown in FIG. 7, there is one vertical path group 70 that includes two paths 62, 64, and one horizontal path group that includes one path 60. FIG. 8 shows another example of a layout of template elements on a canvas 74 in which the user has designated two separate optimization path groups 76, 78, each including a single respective optimization path 80, 82. Document content is not allowed to flow from one optimization path group to another. In response to the designation of an optimization path group, the template design module 26 designates the constituent optimization paths of each optimization path group 70, 76, 78 as a respective group of optimization paths whose associated adaptive layout variables are to be optimized jointly in response to the designation of the optimization path groups 70, 76, 78.

Figure 9:
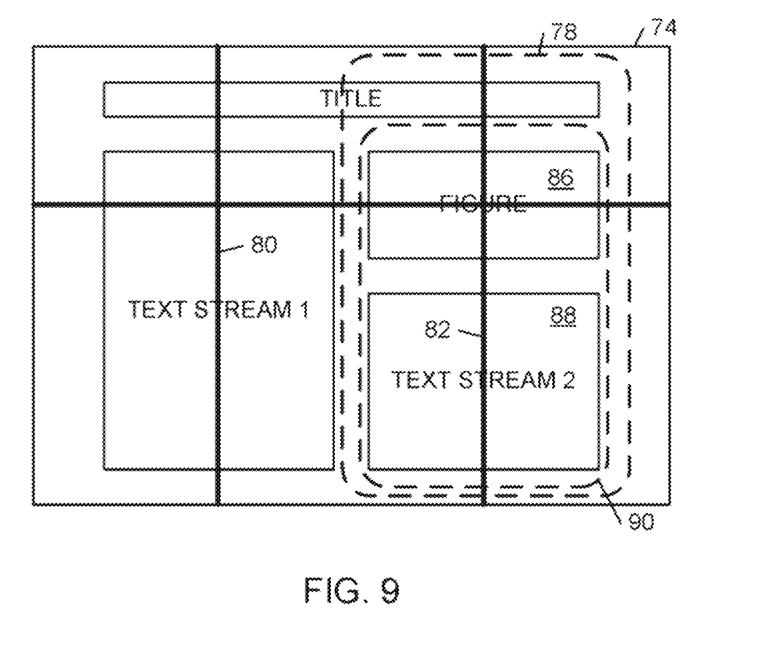
FIG. 9 is a diagrammatic view of an example of the template canvas of FIG. 8 containing an example of a graphical designation of a sub-group of template elements within a group of template elements.

Content template elements also may be grouped together as a sidebar. For example, FIG. 9 shows an example of a layout of the template elements on the template canvas 74 in which the user has designated the content template elements 86, 88 within the optimization path group 78 as a sidebar group 90 by enclosing the elements 86, 88 in a rounded rectangular boundary. Document content is not allowed to flow outside the sidebar. In response to the designation of a side bar group, the template design module 26 designates the elements in the template element sub-group group as a group of template elements whose associated adaptive layout variables are to be optimized jointly with each other in response to the designation of the sidebar group 90.

Figure 10:
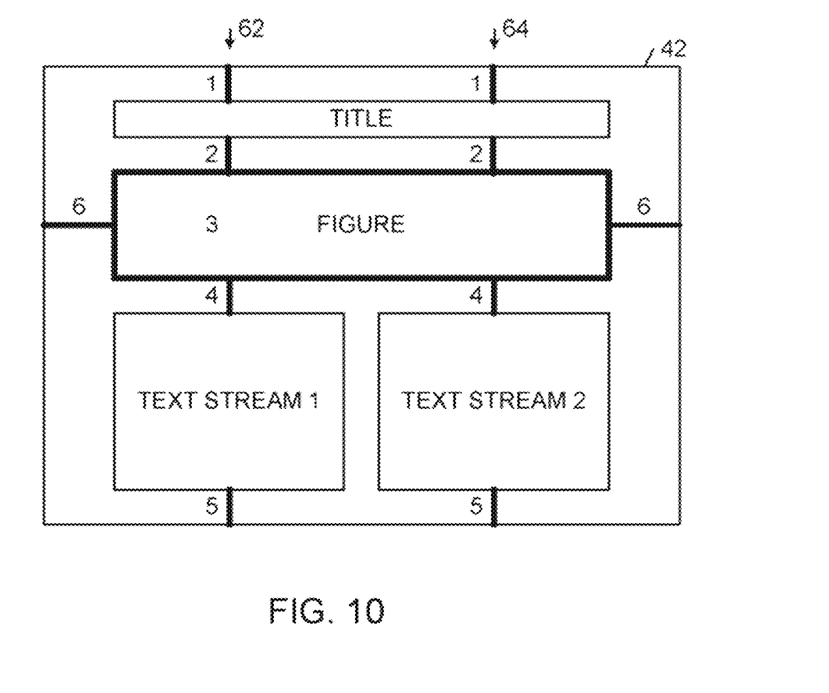
FIG. 10 is a diagrammatic view of an example of the template canvas of FIG. 6 containing indications of variable template elements along the optimization paths.

Each of the template elements is characterized by a respective set of parameters (e.g., height, width, aspect ratio, and positions on the canvas). In some examples, the template design module 26 initially sets the parameters to fixed values that are inferred from the sizes and position of the template elements on the canvas. In some examples, using graphical user interlace commands (e.g., single-clicking or double-clicking a pointing device when the associated pointer 49 is positioned over the selected content template element), the user can designate a selected one of the template elements as a variable element. In response to this designation, the template design module 26 highlights the selected template element. FIG. 10 shows an example of the canvas 46 that contains indications of configurable template element variables along the optimization paths 62, 64 that are highlighted in response to user designation of these template elements as being variable. In this case, the figure block and the white space distances separating the content blocks are highlighted. Each of the variable template elements also is associated with a respective variable identifier (i.e., "1," "2," . . . , "6"). Variables that have the same identifiers are treated by the template design module 26 as having the same parameter values (e.g., equal lengths).

The template design module 26 also responds to the designation of a selected template element as a variable element by generating a parameter specification window that allows the user to enter values of one or more parameters that characterize one or more associated adaptive layout variables that constrain adaptability of the selected template element to different document content. In some examples, for each variable, the user may specify a minimum value, a maximum value, a mean value, and a precision value that characterizes a degree of variability of the variable. In one example, the degree of variability parameter is measure of variation of the associated adaptive layout variable about the mean value. Examples of degree of variability parameters include any type of measure of the variation for dispersion) in values, including but not limited to variance, standard deviation, range, mean deviation, semi-interquartile range, and 10-90 percentile range. In some examples, the degree of variability parameter is a standard deviation of a Gaussian distribution that is centered at the mean value and that is truncated at the minimum and maximum values. With respect to figure content template elements, the user can specify width and height ranges, and a precision value that characterizes a degree of variability of the scale factor for the figure. In some examples, the mean value of the scale parameter automatically is determined by the layout engine 14 based on the aspect ratio of an actual image so as to make the figure as large as possible without violating the specified range conditions on width and height. Thus, the scale factor of a figure has a truncated Gaussian distribution with truncation at the mean.

Figure 11:
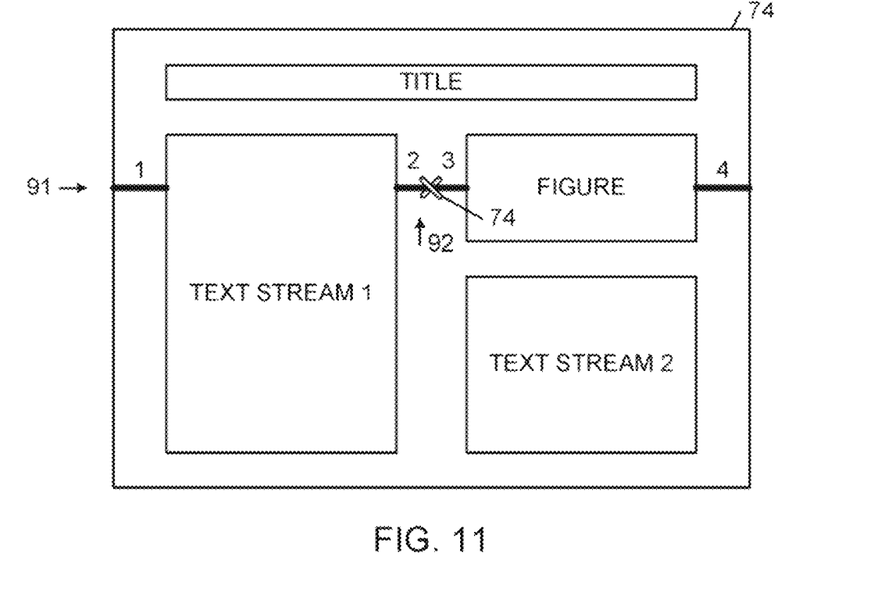
FIG. 11 is a diagrammatic view of an example of a template canvas of FIG. 8 and indications of configurable template elements along an optimization path, including two independently configurable template elements divided from a single template element.

In some examples, the graphical user interface 30 allows the user to split respective ones of the variables. For example, in some implementations, the graphical user interface 30 allows the user to split white space variables into two independent variables in order to enforce a synthetic margin or boundary between content template elements. FIG. 11 shows an example of the template canvas 74 that includes a layout of template elements over which extends a horizontal optimization path 91 that contains a single white space template element 92 that is divided into two independently configurable whitespace template elements (labeled "2" and "3"). In some examples, the user may right click on the white space template element 92 to bring up a context menu that includes an option to split the white space template element 92 into two separate and independently configurable template elements. Based on this input, the template design module 26 divides a respective one of the template elements into multiple separate template elements, each of which is associated with a separate respective set of one or more adaptive layout variables that constrain adaptability of the separate template element to different document content. The user can input values of parameters characterizing the adaptive layout variables respectively associated with the separate template elements through the parameter specification window described above. In the illustrated example, the template design module 26 indicates the splitting of the white space template element 92 which a cross icon 94 that is positioned at the location along the white space template element 92 selected by the user.

As explained in detail below in connection with an example implementation of the layout engine 14, the ability to specify values of the parameters characterizing the associated adaptive layout variables allows the user to guide the layout engine 14 in carrying out the user's aesthetic judgments regarding the design of the final document 12, including relative block placement, white space distribution, and figure scaling. The layout engine 14 is configured to appropriately weight the user's choices as encoded in the variable parameter values.

In some examples, the layout engine 14 is implemented by a probabilistic layout engine that produces variable content documents based on a probabilistic model that assigns a probability score to every possible document, with higher quality documents receiving higher scores. The model parameters typically are set by a user (typically a professional graphic designer) using the template design module 26 described above. In these examples, the layout engine 14 learns for fits) the model and then finds a global optimal document that maximizes a probability score given content (e.g., text, figures, and logical relationships between them) by determining a probabilistic inference over a Bayesian network. Examples of the probabilistic layout engine are described in detail below. Additional details regarding the structure and operation of examples of the probabilistic layout engine are described in co-pending International Patent Application No. PCT/US09/61320, filed Oct. 20, 2009, and in co-pending International Patent Application No. PCT/US09/62288, filed Oct. 28, 2009.

The probabilistic layout engine typically includes three components: a parser that parses style sheets variable document templates, and input document content into internal data structures; an inference engine that computes optimal layouts, given the document content; and a rendering engine that renders the final output document.

In some examples, the parser module includes three separate parsers: a style sheet parser; a content parser; and a variable document template parser. The style sheet parser reads the style sheet 20 for each document content stream 16 and creates a style structure that includes document style and font styles. The content parser reads the content stream and creates respective arrays of structures for figures, text, and sidebars.

The text structure array (referred to as the chunk array) includes information about each independent chunk of text that will be placed on the page. A single text block in the content stream may be chunked as a whole if it cannot flow across columns or pages (e.g., headings, text within sidebars, etc.). If the text block is allowed to flow (e.g., paragraphs, lists, etc.), it is decomposed into smaller chunks that are rendered atomically. Each structure in the chunk array includes its index in the array, chunk height, whether a column or page break is allowed at the chunk, the identifier of the content block to which the chunk belongs, the block type, and an index into the style array to access the style to render the chunk. The height of a chunk is determined by rendering the text chunk at all possible text widths using the specified style in an off-screen rendering process. In some examples, the probabilistic layout engine uses the Scribus desktop publishing rendering engine, which allows the probabilistic layout engine to query the number of rendered lines via an API (Application Programming Interface) of the Scribus application. The probabilistic layout engine uses the number of lines and information regarding the font style and line spacing to calculate the rendered height of a chunk.

Each figure structure in the figure structure array encapsulates the figure properties of an actual figure in the content stream, such as width, height, source filename, caption and the text block id of a text block which references the figure. Figure captions are handled similar to a single text chunk described above allowing various caption widths based on where the caption will actually occur in a template (e.g., full width captions span text columns, while column width captions span a single text column).

Each content sidebar structure in the sidebar structure array may appear in any sidebar template slot (unless explicitly restricted), so the sidebar array has elements which are themselves arrays with individual elements describing allocations to different possible sidebar styles. Each of these structures has a separate figure array and chunk array for figures and text that appear within a particular template sidebar.

Given the document content 16, style sheets 20, and the variable document template structures, the inference engine solves for the optimal layout of the given content by simultaneously allocating content to a sequence of templates chosen from the template library, and solving for template parameters that allow maximal page fill while incorporating the aesthetic judgements of the graphic designers encoded in the prior parameter distributions. The inference engine is based on a framework referred to herein as the Probabilistic Document Model (PDM), which models the generation of arbitrary multi-page documents.

According to the PDM the $i^{th}$ page of a document is generated by first choosing a template $T_i$ from a library of templates, then setting its parameter vector $\Theta_i$, and then allocating content $C_i$ (e.g., images sidebars, and text blocks) to that page. Each of these tasks is performed by sampling from a conditional probability distribution. For example, $P(T_i=t_k)$ is the probability of picking a particular template $t_k$ for the $i^{th}$ page from a set of K templates in the template library. If there is no a priori choice for a template, this probability is typically simply 1/K. Other values can be set for the template probabilities so that certain templates can be made more of less likely to be used in creating a document. Thus:

$$P(T_i) = p_k \text{ where } \sum_k^K p_k = 1 \qquad (1)$$

Once a template is selected, the inference engine samples its parameter vector $\Theta_i$ from the conditional distribution $P(\Theta_i|T_i)$. The inference engine models this distribution to be a multivariate normal distribution that describes the prior probabilities of various parameter settings. This distribution can be directly derived from the parameter distributions in the variable document templates that encode the template designer's aesthetic choices about desired parameter values. Sampling from this distribution makes these aesthetic parameter settings more likely. Thus:

$$P(\Theta_i|T_i) = N(\Theta_i|\overline{\Theta}_i, \Lambda^{-1}) \qquad (2)$$

Where $\overline{\Theta}_i$ and $\Lambda$ represent the means and precisions of the parameters as entered by a graphic designer. In fact any desired linear relation (proportions, ratios etc.) between parameters can be captured in the above prior probability distribution.

Finally, the inference engine samples the allocation for the current page $C_i$ from a probability distribution $P(C_i|C_{i-1}, \Theta_i)$. In this example, the model assumes that the current allocation is independent of the template and parameter selections for all previous pages, given the allocation to the previous page and the parameter settings for the current page. The allocation to the previous page affects the probability of an allocation for the current page via the logical relationship content in the previous page has to content on the current page. First, information on content allocated to the previous page is sufficient to conclude that all prior content has already been allocated. Thus, previous page allocation allows the inference engine to determine if a figure or sidebar appearing on the current page is referenced in a prior page. This would reduce the probability of the current allocation since the figure/sidebar does not appear on the same page as its reference. Furthermore, $P(C_i|C_{i-1}, \Theta_i)$ depends on the parameter settings since certain parameter settings fill the page with the existing content better than others and are hence assigned higher probability. This conditional distribution is given by:

$$P(C_i \mid C_{i-1}, \Theta_i) \propto \exp(-\gamma \mid R(C_i, C_{i-1}) \mid) \quad (3)$$

$$\prod_{m=1}^{M} N(H_m(C_i) \mid \Theta_i^T y_m, \alpha^{-1}) \prod_{n=1}^{N} N(W_n(C_i) \mid \Theta_i^T x_n, \beta^{-1})$$

In the above equation, $|R(C_i,C_{i-1})|$ represents the number of dangling references due to the allocation $C_i$ to the $i^{th}$ page and $C_{i-1}$ to the $(i-1)^{th}$ page. The constant $\gamma$ represents an exponential weighting factor that represents how much to penalize mismatched references in the probability distribution. $H_m(C_i)$ and $W_n(C_i)$ represent the height and width of a Y and X path group respectively after subtracting fixed spaces and reserved regions in the Y and X directions. The variables $y_m$ and $x_n$ represent content dependent vectors that represent actual figure heights, widths and whitespace in each direction, for each path group. For good page fill in the Y and X directions $H_m(C_i)-\Theta_i^T y_m \approx 0$ and $W_n(C_i)-\Theta_i^T x_n \approx 0$. The normal distributions above simply assign high probability to these events and lower probability for deviations from ideal. The constants $\alpha$ and $\beta$ are precision variables of the normal distribution that control the degree to which production of full pages is favored.

Figure 12:
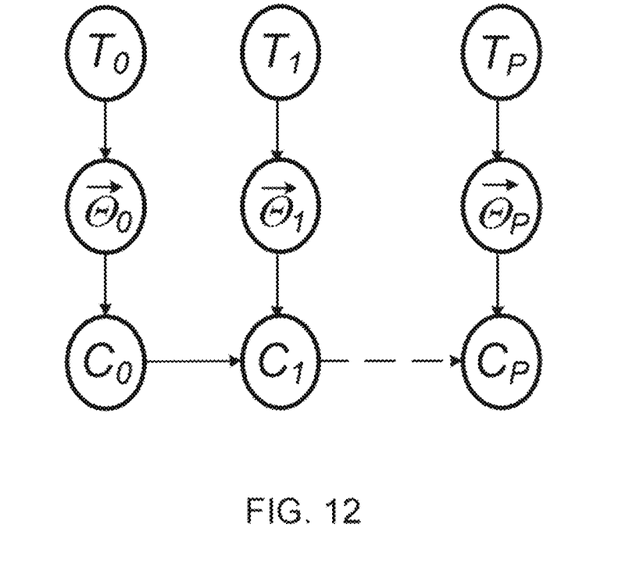
FIG. 12 is a diagrammatic view of an example of a representation of a document as a sequence of templates, template parameters, and content allocations that is sampled from an overall probability distribution over P pages.

The probabilistic layout engine generates documents by repeating the sampling process, page by page. Thus, a document is a sequence of templates, template parameters, and content allocations that is sampled from an overall probability distribution over P pages, given by:

$$P(\{T_j\}, \{\Theta_i\}, \{C_i\}) = \quad (4)$$

$$P(C_0 \mid \Theta_0) P(\Theta_0 \mid T_0) P(T_0) \prod_{i=1}^{P} P(C_i \mid C_{i-1}, \Theta_i) P(\Theta_i \mid T_i) P(T_i)$$

This distribution may be represented as a directed graph as shown FIG. 12. The distribution is generated from the graph by multiplying the conditional probability distributions of each node conditioned only on its parents. Such a model is called a Bayesian network model for the underlying probability distribution. The model is generative, in the sense that a sequential process (as described above) can be used to generate pages and thus documents from the model. The documents generated by this process are samples drawn by the inference engine from the probability distribution described above. Although the sampling procedure generates documents with various probabilities (recall that higher probabilities translate to higher quality), the inference engine is configured to find the document that has the highest probability. In this process, the inference engine computes the optimizing sequence of templates $\{T_i^*\}$, template parameters $\{\Theta_i^*\}$, and allocations $\{C_i^*\}$ that maximize document probability.

Although all the variables influence each other in general, a variable is only directly influenced by a few neighbors at most. This fact allows the inference engine to use the structure of the graph in performing the desired maximization. The variable $\Theta_0$ appears in only two terms with two other variables, $C_0$ and $T_0$. This allows the inference engine to maximize over $\Theta_0$ without looping over every possible value of every node (variable) in the network. Thus we have:

$$\Psi(C_0, T_0) = \max_{\Theta_0} P(C_0 \mid \Theta_0) P(\Theta_0 \mid T_0) = \max_{\Theta_0} P(\Theta_0 \mid C_0, T_0) \quad (5)$$

This maximization is performed for all possible values of $C_0$ and $T_0$ but the inference engine does not need to consider variations in other variables in the network. Even so, this is would still be a challenging task in general. The particular distributions that are used for $P(\Theta_i|T_i)$ and $P(C_i|C_{i-1}, \Theta_i)$ make this task particularly efficient for the inference engine since these are conjugate normal distributions and their product also is normal. The maximizing value is the mean of the distribution, which can be computed in closed form using the equation $$\Theta_i^* = \left(\Lambda + \sum_m \alpha x_m x_m^T + \sum_n \beta y_n y_n^T\right)^{-1} \quad (6)$$

$$\left\{\Lambda \overline{\Theta} + \sum_m \alpha W_m(C_i) x_m + \sum_n \beta H_n(C_i) y_n\right\}$$

Not only is this efficient to compute, but the effect of incremental allocations is even more efficient to compute. Allocating an additional text chunk would only affect the right hand side of the above equation and only a few multiply accumulates are necessary to update from $\psi(C_0, T_0)$ to $\psi(C_0+\delta, T_0)$. In some examples additional speedup in computing $\psi(C_0, T_0)$ is obtained by configuring the inference engine to: screen allocation $C_0$ and avoiding computation altogether for invalid allocations (e.g., figure or sidebar occurring before its reference, widowed or orphaned text chunks etc.); screen templates for compatibility (e.g., content with two figures cannot be allocated to a template with only one figure); and screen for too much and too little content that make it impossible to fill the page even when template parameters are maximum or minimum. These screening approaches significantly reduce the number of cases for which optimization is performed.

Once $\psi(C_0, T_0)$ is computed, the inference engine maximizes over template choices of the variable $T_0$, which occurs only in the terms $P(T_0)$ and $\psi(C_0, T_0)$, to compute:

$$\phi(C_0) = \max_{T_0} \Psi(C_0, T_0) P(T_0) \qquad (7)$$

In general, eliminating (via maximization) variables $\Theta_i$ and $T_i$ yields the functions $\phi(C_i, C_{i-1})$. Note that $\psi(C_0)$ is simply $\phi(C_0, \{\})$. The inference engine proceeds by eliminating variables $C_0, C_1, \ldots C_P$ as described above.

$$\tau_1(C_1) = \max_{C_0} \phi(C_0) \phi(C_1, C_0) \qquad (8)$$

$$\tau_2(C_2) = \max_{C_1} \tau_1(C_1) \phi(C_2, C_1)$$

$$\vdots$$

$$\tau_P(C_P) = \max_{C_{P-1}} \tau_{P-1}(C_{P-1}) \phi(C_P, C_{P-1})$$

The process stops when all of the input content has been allocated and $T_P$ is chosen as the maximum of all last page possibilities. From the allocation to the final page. $C_{P-1}^*$ the inference engine computes the optimal allocation to the previous page, $C_{P-1}^*$ that caused $T_P(C_P^*)$ to be maximized. Then the inference engine determines the value of $C_{P-2}^*$ that caused $T_P(C_{P-1}^*)$ to be maximum and so on. This allows the inference engine to solve for optimal allocations for all P pages. Once the allocations for each page are determined, the inference engine looks up the optimal template for each page by finding the template $T_i^*$ that maximizes $\psi(C_i^*, T_i)$. Once the template and the allocation are known, the inference engine determines the template parameters using the dosed form solution for $\Theta_i^*$ given above. Once the page count, allocations to pages, template selection, and parameter estimation are done the inference task is complete. The solution found by this approach is globally optimal, at a significant computational advantage over exhaustive enumeration of all possibilities.

In some examples, the probabilistic layout engine uses the Scribus API to create the final document 16. For each page, the rendering engine traverses the Y and X paths of the chosen page template and renders content blocks as they are encountered. Optimal template parameters determined via inference are used directly to determine the positions, widths, and heights of all blocks. The rendering engine produces a render table structure that keeps track of items that have already been rendered to avoid duplicate rendering. Text blocks are rendered in the Y-path and image blocks are rendered after a complete X and Y pass. Separate layers are created to render background and foreground items.

Examples of the document processing system 10 (including the template design module 26) may be implemented by one or more discrete modules (or data processing components) that are not limited to any particular hardware, or machine readable instructions (e.g., firmware or software) configuration. In the illustrated examples, these modules may be implemented in any computing or data processing environment, including in digital electronic circuitry (e.g., an application-specific integrated circuit, such as a digital signal processor (DSP)) or in computer hardware, device driver, or machine readable instructions (including firmware or software). In some examples, the functionalities of the modules are combined into a single data processing component. In some examples, the respective functionalities of each of one or more of the modules are performed by a respective set of multiple data processing components.

The modules of the document processing system 10 may be co-located on a single apparatus or they may be distributed across multiple apparatus; if distributed across multiple apparatus, these modules and the display 24 may communicate with each other over local wired or wireless connections, or they may communicate over global network connections (e.g., communications over the Internet).

In some implementations, process instructions (e.g., machine-readable code, such as computer software) for implementing the methods that are executed by the examples of the document processing system 10, as well as the data they generate, are stored in one or more machine-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks. DVD-ROM/RAM, and CD-ROM/RAM.

In general, examples of the variable document template generation system 10 may be implemented in any one of a wide variety of electronic devices, including desktop computers, workstation computers, and server computers.

Figure 13:
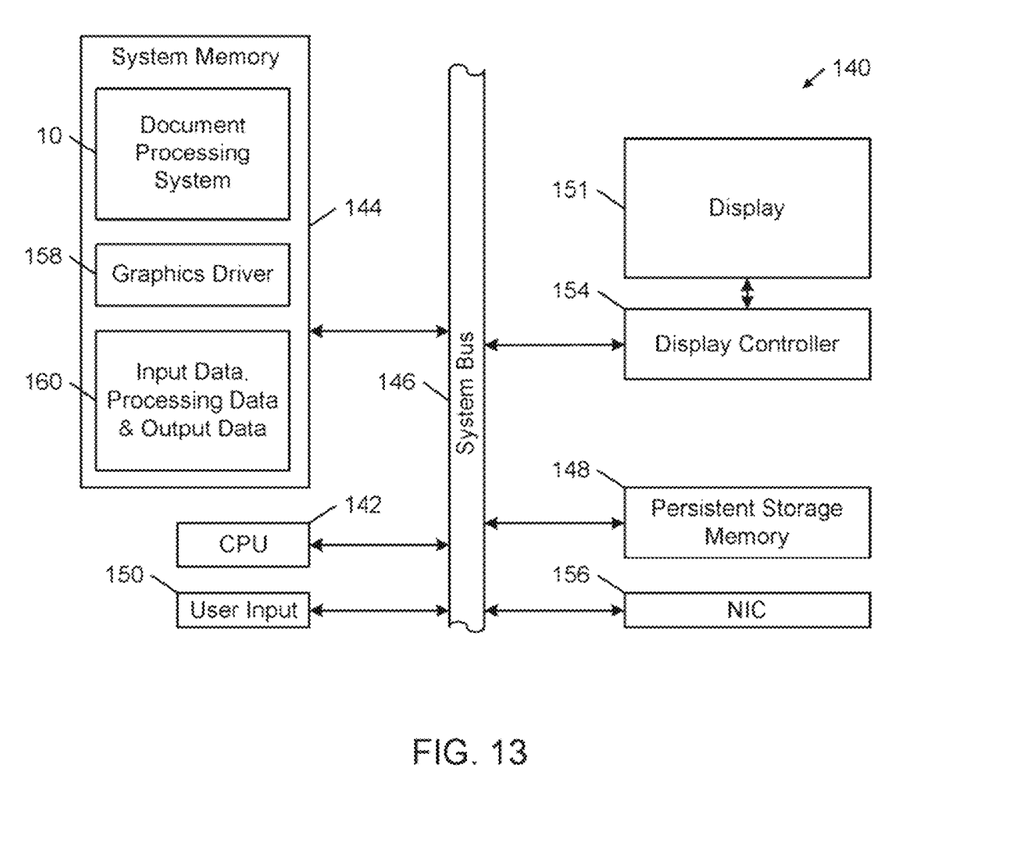
FIG. 13 is a block diagram of an example of a computer system.

FIG. 13 shows an example of a computer system 140 that can implement any of the examples of the document processing system 10 that are described herein. The computer system 140 includes a processing unit 142 (CPU), a system memory 144, and a system bus 146 that couples processing unit 142 to the various components of the computer system 140. The processing unit 142 typically includes one or more processors, each of which may be in the form of any one of various commercially available processors. The system memory 144 typically includes a read only memory (ROM) that stores a basic input/output system (BIOS) that contains start-up routines for the computer system 140 and a random access memory (RAM). The system bus 146 may be a memory bus, a peripheral bus or a local bus, and may be compatible with any of a variety of bus protocols, including PCI, VESA, Microchannel, ISA, and EISA. The computer system 140 also includes a persistent storage memory 148 (e.g., a hard drive, a floppy drive, a CD ROM drive, magnetic tape drives, flash memory devices, and digital video disks) that is connected to the system bus 146 and contains one or more computer-readable media disks that provide non-volatile or persistent storage for data, data structures and computer-executable instructions.

A user may interact (e.g., enter commands or data) with the computer 140 using one or more input devices 170 (e.g., a keyboard, a computer mouse, a microphone, joystick, and touch pad). Information may be presented through a user interface that is displayed to a user on the display 151 (implemented by, e.g., a display monitor), which is controlled by a display controller 154 (implemented by, e.g., a video graphics card). The computer system 140 also typically includes peripheral output devices, such as speakers and a printer. One or more remote computers may be connected to the computer system 140 through a network interface card (NIC) 156.

As shown in FIG. 13, the system memory 144 also stores the document processing system 10, a graphics driver 158, and processing information 160 that includes input data, processing data, and output data. In some examples, the document processing system 10 interfaces with the graphics driver 158 to present a user interface on the display 151 for managing and controlling the operation of the document processing system 10.

Other embodiments are within the scope of the claims.

The invention claimed is:

1. A method, comprising:
on a display, displaying a graphical user interface comprising a template design area;
based on one or more commands received through the graphical user interface, arranging a layout of template elements with respective relative positions and sizes in the template design area, wherein at least one of the template elements is designated for receiving variable document content;
through the graphical user interface from a user:
receiving values of parameters characterizing one or more associated adaptive layout variables that constrain adaptability of respective ones of the template elements to different document content wherein the parameters characterizes a degree of variability about a mean value of the associated adaptive layout variable,
grouping respective ones of the template elements into a template element group, and
receiving a specification of an optimization path and path groups that define the logical relationships between the template elements;
encoding the relative positions of the template elements in the template design area in association with the respective parameter values and the optimization path and path groups in a variable document template data structure; and
displaying a graphic representation of the optimization path and path groups in the template design area;
wherein the displaying, the receiving, the encoding and the displaying are performed by a computer system.

2. The method of claim 1, further comprising solving by the computer system for an optimal layout of variable document content over multiple pages by simultaneously allocating the variable document content to a sequence of multiple variable document template data structures in a table library and solving for template parameters that allow maximal page fill of the variable document content by assigning a probability to the multiple variable document template data structures for each page wherein the probability is indicative of maximal page fill and selecting a respective document template data structure for each page that has the highest probability.

3. The method of claim 2, wherein allocating of variable document content to a current page is affected by the probability of a previous page and probability of the previous page is weighted by an exponential weighting factor that represents how much to penalize mismatched referenced document content between the current page and the previous page.

4. The method of claim 2, wherein solving for an optimal layout of document content over multiple pages further comprises screening the document content to avoid assigning a probability for each page for variable document template data structures that are invalid, incompatible, and substantially unable to fill the respective page with the document contents.

5. The method of claim 2, wherein solving for an optimal layout of document content over multiple pages further comprises selecting a particular document template from the template library that maximizes the probability for a last page and based on allocation of content to the last page and starting with the last page as a current page, iteratively allocating content to a previous page that caused the current page to be maximized.

6. The method of claim 1, wherein the receiving of a specification of the optimization path is performed based on one or more commands received through the graphical user interface from the user that specify a line extending over the template elements of the template element group in the template design area.

7. The method of claim 6, wherein the specification defines the optimization path in terms of a directed graph of nodes respectively representing the template elements in the template element group, and the generating comprises ordering the nodes of the directed graph in accordance with the relative positions of the template elements along the line in the template design area.

8. The method of claim 1, wherein the encoding comprises designating the elements in the template element group as a group of template elements whose associated adaptive layout variables are to be optimized jointly.

9. The method of claim 1, further comprising:
based on one or more commands received through the graphical user interface from the user:
grouping respective ones of the template elements into at least one other template element group, and generating for each other template element group a respective specification of a respective optimization path; and
grouping multiple of the optimization paths into an optimization path group;
wherein the encoding comprises designating the optimization paths in the optimization path group as a group of optimization paths whose associated adaptive layout variables are to be optimized jointly.

10. The method of claim 1, further comprising
based on one or more commands received through the graphical user interface from the user,
grouping respective ones of the template elements in the template element group into a template element sub-group; and
the processor, further performs:
generating a respective specification of a sub-group optimization path comprising a directed graph of nodes respectively representing the template elements in the template element sub-group group;
encoding the specification of the sub-group optimization path into the variable document template data structure; and
displaying a graphic representation of the sub-group optimization path in the template design area.

11. The method of claim 10, wherein the encoding comprises designating the elements in the template element sub-group group as a group of template elements whose associated adaptive layout variables are to be optimized jointly with each other.

12. The method of claim 1, further comprising:
based on one or more commands received through the graphical user interface, dividing a respective one of the template elements into multiple separate template elements, wherein each of the separate template elements is associated with a separate respective set of one or more adaptive layout variables that constrain adaptability of the separate template element to different document content; and
through the graphical user interface from the user, receiving values of parameters characterizing the adaptive layout variables respectively associated with the separate template elements.

13. The method of claim 1, wherein the encoding comprises encoding the relative positions of the template elements in association with the respective parameter values in the variable document template data structure in accordance with a markup language schema, and the encoding of each of one or the template elements comprises associating each template element designated for receiving variable document content with an attribute tag denote a respective document content type.

14. The method of claim 1, wherein the variable document template data structure is consistent with at least one associated style sheet comprising document content type definitions, and a respective document content formatting definition for each document content type definition.

15. Apparatus, comprising:
a computer-readable memory storing computer-readable instructions; and
a data processor coupled to the memory, operable to execute the instructions, and based at least in part on the execution of the instructions operable to perform operations comprising:
displaying a graphical user interface comprising a template design area;
based on one or more commands received through the graphical user interface from a user,
arranging a layout of template elements with respective relative positions and sizes in the template design area, wherein at least one of the template elements is designated for receiving variable document content,
receiving values of parameters characterizing one or more associated adaptive layout variables that constrain adaptability of respective ones of the template elements to different document content, wherein the parameters characterizes a degree of variability about a mean value of the associated adaptive layout variable,
grouping respective ones of the template elements into a template element group, and
receiving a specification of an optimization path and path groups that define the logical relationships between the template elements;
encoding the relative positions of the template elements in the template design area in association with the respective parameter values and the optimization path and path groups in a variable document template data structures; and
displaying a graphic representation of the optimization path and path groups in the template design area.

16. The apparatus of claim 15, further comprising
solving for an optimal layout of the variable document content over multiple pages by simultaneously allocating the variable document content to a sequence of multiple variable document template data structures in a table library and solving for template parameters that allow maximal page fill of the variable document content by assigning a probability to the multiple variable document template data structures for each page wherein the probability is indicative of maximal page fill and selecting a respective document template data structure for each page that has the highest probability.

17. The apparatus of claim 16, wherein allocating of content of a current page is affected by the probability of a previous page and probability of the previous page is weighted by an exponential weighting factor that represents how much to penalize mismatched referenced document content between the current page and the previous page.

18. At least one computer-readable non-transitory medium having computer-readable program code embodied therein, the computer-readable program code adapted to be executed by a computer to implement a method comprising:
displaying a graphical user interface comprising a template design area;
based on one or more commands received through the graphical user interface,
arranging a layout of template elements with respective relative positions and sizes in the template design area, wherein at least one of the template elements is designated for receiving variable document content,
receiving values of parameters characterizing one or more associated adaptive layout variables that constrain adaptability of respective ones of the template elements to different document content, wherein at least one of the parameters characterizes a degree of variability about a mean value of the associated adaptive layout variable,
grouping respective ones of the template elements into a template element group, and
receiving a specification of an optimization path and path groups that define the logical relationships between the template elements;
encoding the relative positions of the template elements in the template design area in association with the respective parameter values in a variable document template data structure; and
displaying a graphic representation of the optimization path and path groups in the template design area.

19. The medium of claim 18, further comprising solving for an optimal layout of the variable document content over multiple pages by simultaneously allocating the variable document content to a sequence of multiple variable document template data structures in a table library and solving for template parameters that allow maximal page fill of the variable document content by assigning a probability to the multiple variable document template data structures for each page wherein the probability is indicative of maximal page fill and selecting a respective document template data structure for each page that has the highest probability.

20. The medium of claim 19, wherein allocating of the variable document content to a current page is affected by the probability of a previous page and probability of the previous page is weighted by an exponential weighting factor that represents how much to penalize mismatched referenced document content between the current page and the previous page.

* * * * *